United States Patent
Möller et al.

(10) Patent No.: US 11,208,806 B2
(45) Date of Patent: Dec. 28, 2021

(54) LIGHTWEIGHT CONSTRUCTION BOARD CONTAINING WAVE-LIKE ELEMENTS

(71) Applicant: Wood Innovations Ltd., Eschen (LI)

(72) Inventors: Achim Möller, Dresden (DE); Thomas Eckstein, Dresden (DE)

(73) Assignee: Wood Innovations Ltd., Eschen (LI)

( * ) Notice: Subject to any disclaimer, the term of this patent is extended or adjusted under 35 U.S.C. 154(b) by 0 days.

(21) Appl. No.: 16/078,515

(22) PCT Filed: Feb. 22, 2017

(86) PCT No.: PCT/EP2017/054079
§ 371 (c)(1),
(2) Date: Sep. 13, 2018

(87) PCT Pub. No.: WO2017/144541
PCT Pub. Date: Aug. 31, 2017

(65) Prior Publication Data
US 2019/0153729 A1    May 23, 2019

(30) Foreign Application Priority Data

Feb. 22, 2016    (EP) .................................... 16000427

(51) Int. Cl.
*E04C 2/16*    (2006.01)
*B27N 5/00*    (2006.01)
(Continued)

(52) U.S. Cl.
CPC .................. *E04C 2/16* (2013.01); *B27N 5/00* (2013.01); *B32B 3/28* (2013.01); *B32B 7/12* (2013.01);
(Continued)

(58) Field of Classification Search
CPC ..... E04C 2/16; E04C 2/322; E04C 2002/3466
See application file for complete search history.

(56) References Cited

U.S. PATENT DOCUMENTS 2,058,334 A    6/1933   Mason
2,759,506 A    8/1956   Knowles
(Continued)

FOREIGN PATENT DOCUMENTS

CH    208219    3/1939
CH    274037    12/1947
(Continued)

OTHER PUBLICATIONS

Definition of Veneer: https://www.rockler.com/wood/veneer.*
(Continued)

*Primary Examiner* — Adriana Figueroa
(74) *Attorney, Agent, or Firm* — Stoel Rives LLP

(57) ABSTRACT

A lightweight building board element, wherein the element has the shape of a first spatially extending wave, wherein the upper side of said element has at least one wave peak and the lower side of said element has at least one wave trough, wherein the first wave expands transversally or radially, and wherein the at least one wave peak and the at least one wave trough exist in the form of a second wave, and wherein the lightweight building board element contains or consists of bonded wood fibers or bonded wood shavings or bonded wood fibers and wood shavings.

17 Claims, 5 Drawing Sheets

(51) Int. Cl.

| | | |
|---|---|---|
| *B32B 21/02* | (2006.01) | |
| *E04C 2/32* | (2006.01) | |
| *B32B 21/04* | (2006.01) | |
| *B32B 7/12* | (2006.01) | |
| *B32B 21/14* | (2006.01) | |
| *B32B 15/10* | (2006.01) | |
| *B32B 3/28* | (2006.01) | |
| *B32B 13/10* | (2006.01) | |
| *B32B 21/08* | (2006.01) | |
| *E04C 2/34* | (2006.01) | |

(52) U.S. Cl.
CPC ............ *B32B 13/10* (2013.01); *B32B 15/10* (2013.01); *B32B 21/02* (2013.01); *B32B 21/042* (2013.01); *B32B 21/08* (2013.01); *B32B 21/14* (2013.01); *E04C 2/322* (2013.01); *B32B 2250/40* (2013.01); *B32B 2262/02* (2013.01); *B32B 2262/06* (2013.01); *B32B 2262/067* (2013.01); *B32B 2262/08* (2013.01); *B32B 2264/067* (2013.01); *B32B 2307/102* (2013.01); *B32B 2307/304* (2013.01); *B32B 2307/718* (2013.01); *B32B 2451/00* (2013.01); *B32B 2479/00* (2013.01); *B32B 2553/00* (2013.01); *B32B 2605/003* (2013.01); *B32B 2605/08* (2013.01); *B32B 2605/18* (2013.01); *E04C 2002/3466* (2013.01)

(56) References Cited

U.S. PATENT DOCUMENTS

| | | | | |
|---|---|---|---|---|
| 2,785,717 | A | | 3/1957 | Knowles |
| 4,035,538 | A | | 7/1977 | Maekawa et al. |
| 4,250,728 | A | * | 2/1981 | King ...................... B21D 11/18 428/603 |
| 4,320,648 | A | * | 3/1982 | Ekmark ................. B21D 11/18 428/603 |
| 4,428,993 | A | * | 1/1984 | Kohn ........................ B32B 3/12 428/117 |
| 4,444,037 | A | * | 4/1984 | Norgate ................. B21D 13/02 72/177 |
| 4,528,835 | A | * | 7/1985 | Ekmark .................... E04D 3/30 72/301 |
| 4,559,195 | A | * | 12/1985 | Heggenstaller .......... E04C 2/16 264/120 |
| 5,738,924 | A | * | 4/1998 | Sing ......................... B32B 3/12 428/68 |
| 5,900,304 | A | * | 5/1999 | Owens ..................... B32B 3/28 428/182 |
| 7,690,169 | B2 | * | 4/2010 | Saarenko ................. E04D 1/06 52/518 |
| 8,058,193 | B2 | * | 11/2011 | Clark ....................... E04C 2/16 442/413 |
| 8,297,027 | B2 | * | 10/2012 | Noble ..................... B32B 5/022 52/783.11 |
| 8,475,894 | B2 | * | 7/2013 | Noble ....................... B32B 7/05 428/34.2 |
| 10,053,191 | B2 | * | 8/2018 | Eckstein .................... E04C 2/12 |
| 2003/0041547 | A1 | * | 3/2003 | Gosselin ................. B32B 21/02 52/630 |
| 2004/0074205 | A1 | * | 4/2004 | Stache ...................... E04C 2/36 52/783.11 |
| 2005/0241267 | A1 | * | 11/2005 | Wu .......................... B27D 1/06 52/783.11 |
| 2008/0033075 | A1 | * | 2/2008 | Schmidt .................... E04C 2/16 523/206 |
| 2008/0197536 | A1 | * | 8/2008 | Fujii ........................ B27N 3/08 264/320 |
| 2013/0316125 | A1 | * | 11/2013 | Moeller ................. E04C 2/322 428/106 |
| 2016/0288880 | A1 | | 10/2016 | Eckstein et al. |

FOREIGN PATENT DOCUMENTS

| | | | | |
|---|---|---|---|---|
| DE | 887115 | | 8/1953 | |
| DE | 1214384 | | 2/1962 | |
| DE | 2132789 | | 7/1971 | |
| DE | 4201201 | | 7/1993 | |
| DE | 102008022805 | | 5/2008 | |
| DE | 102008022805 A1 | * | 11/2009 | ............... B27D 1/06 |
| EP | 2488337 B1 | * | 4/2014 | ............... B27N 3/06 |
| FR | 1074752 | | 1/1953 | |
| FR | 1373515 | | 10/1963 | |
| GB | 532724 | | 5/1939 | |
| GB | 560913 | | 10/1942 | |
| GB | 607214 | | 8/1945 | |
| GB | 1069985 | | 11/1963 | |
| GB | 1360105 | | 7/1974 | |
| JP | 10278014 | | 10/1998 | |
| WO | 199963180 | | 6/1998 | |
| WO | 200058581 | | 10/2000 | |
| WO | 2002092300 | | 11/2002 | |
| WO | 2009067344 | | 5/2009 | |
| WO | 2013164100 | | 11/2013 | |
| WO | 2015149942 | | 10/2015 | |

OTHER PUBLICATIONS https://en.wikipedia.org/wiki/Wood_fibre (Year: 2020).*
https://www.merriam-webster.com/dictionary/wood%20fiber (Year: 2020).*
European Search Report dated Sep. 18, 2014 for EP14001220.4.
International Search Report and Written Opinion dated Jul. 24, 2015 for PCT/EP2015/000702.
Office Action dated Oct. 11, 2018 for U.S. Appl. No. 15/300,415.
Office Action dated Apr. 10, 2019 for U.S. Appl. No. 15/300,415.
Third Party Observations dated Aug. 26, 2021.

* cited by examiner

LIGHTWEIGHT CONSTRUCTION BOARD CONTAINING WAVE-LIKE ELEMENTS

RELATED APPLICATIONS

This application is the U.S. National Stage filing under 35 U.S.C. 371 of International Patent Application No. PCT/EP2017/054079, filed on Feb. 22, 2017 and titled LIGHTWEIGHT CONSTRUCTION BOARD CONTAINING WAVE-LIKE ELEMENTS, which claims the benefit of European Patent Application No. 16000427.1, filed on Feb. 22, 2016, each of which is incorporated herein by reference in its entirety.

FIELD OF THE INVENTION

The present invention relates to a multi-layer composite and a core layer of the multi-layer composite containing undulated elements. The multi-layer composite can be used as a lightweight building board or to produce a lightweight building board. The invention further relates to an undulated or wavy element in the form of a lightweight building board, a method for producing the undulated element, the core layer and the multi-layer composite as well as the use thereof.

BACKGROUND OF THE INVENTION

It is known that composite materials are used to produce multi-layer composites, which have relatively high mechanical stability compared to their weight.

CH 254025 relates to a multi-layer composite having two cover plates and a core layer between them, wherein said core layer includes at least one layer of folded veneer.

DE 42 01 201 relates to a semi-finished product or finished product that consists of wood and is produced from platelet-like surface elements. The platelet-like surface elements can be configured in a zig-zag shape.

DE 10 2008 022 806 relates to a lightweight building board with an undulated layer of wood veneer. The waves can be configured in a zig-zag shape.

BE 547 811 relates to a core layer consisting of two zig-zag-shaped wood elements, which are arranged between two top layers.

DE 10 2008 022805 A1 relates to a corrugated veneer board and lightweight building boards constructed on it. The wave structure of the wood elements that are used can have a zig-zag, sinusoidal and trapezoidal shape.

EP 1 923 209 relates to a lightweight composite building board having outer layers and a middle layer, wherein the middle layer is arranged at an angle to the plane of the lightweight composite building board.

WO 2008/067662 discloses a lightweight building board having a core layer, which is composed of at least one flexible undulated wood veneer. The lightweight building board also has two outer wooden panels, which are glued to the core layer.

EP 2 873 522 discloses a method for producing a composite board and a composite board itself. The method comprises the following steps: producing at least two undulated wooden composite boards; connecting the at least two undulated wooden composite boards to bearing sections on the surface of the wooden composite boards; segmenting the interconnected undulated wooden composite board into packets of undulated lamellas with separating edges and a surface; arranging a packet of undulated lamellas between two outer panels of wood material, wherein the surface of the undulated lamellas is arranged between the two outer panels at an angle that deviates from 90° relative to the plane that is formed by a top layer.

Common to these multi-layer composites from the prior art is the fact that the core layer has a loosened structure. When force is exerted perpendicularly to the surface of the multi-layer composite, it has a damping effect, since the core layer can be at least partly compressed.

A disadvantage of the loosened core layers can be seen in the fact that they can have lower homogeneity, which is brought about by relatively large cavities in the core layer.

Lightweight building boards with improved stability are described in EP 2 660 408 A1 and WO 2015/067362. These patent applications relate to a core layer that is suitable for a multi-layer composite having at least one top layer and one core layer, wherein the top layer is arranged such that it at least partly covered the core layer and is firmly connected to it, wherein the core layer contains elements of wood, which have platelet-like regions that are arranged in a zig-zag shape, wherein a platelet-like zig region of an element and an adjacent platelet-like zag region of the element together form a common edge between them in such a way that the zig-zag-shaped wood element is formed, wherein zig-zag-shaped elements are arranged in the core layer such that two such edges of two different elements intersect at an angle that is not zero, and wherein the two elements are fixedly connected to each other at the point of intersection.

EP 2 488 337 B1 (WO 2011/079920) relates to a method for producing a particle-based element, namely a chipboard or fiber board, wherein the element can be undulated in a longitudinal direction or can be undulated in both a longitudinal direction and a width direction.

EP 1 758 733 B1 (WO 2005/113230 A1) relates to a sandwich element comprising at least two top layers and at least one middle layer, which is disposed between the top layers, in the form of a periodically recurring, double-curved shell structure with principle curvatures in the opposite directions, as well as a method for producing it and a use.

BACKGROUND OF THE INVENTION

Owing to the constant increase in the need for lightweight building boards with high stability under load, the problem addressed by the present invention consists in providing corresponding products, especially products that have the highest possible strength and resilience with the lowest possible weight. These lightweight building boards should additionally be cost-effective to produce, in particular by integrating manufacturing technology into existing production facilities.

SUMMARY OF THE INVENTION

This problem is solved according to the invention with a multi-layer composite having a core layer containing undulated elements, which comprise or consist of interconnected wood fibers or interconnected wood chips or interconnected OSB chips or two or more of these.

Claimed subject matter of the present invention also includes an undulated element, namely an undulated lightweight building board element.

The subjects claimed in the invention are defined in the following points 1 through 15:

1. Core layer having lightweight building board elements, wherein
   the lightweight building board elements have the form of a spatially extending first wave, wherein the upper side of the elements has at least one wave peak and the lower side of the elements has at least one wave trough, wherein the first wave expands transversally or radially, wherein the elements comprise or consist of interconnected wood fibers or interconnected wood chips or interconnected OSB chips or two or more of these, wherein the lightweight building board elements in the core layer are arranged in at least one first and one second layer and are at least partly adhered together; or the lightweight building board elements extend along a surface—especially a flat surface—wherein the lightweight building board elements have a first undulated profile of a first wave running along the surface with an elongation that changes along a first direction of propagation, in which wave peaks on the upper side and lower side of the lightweight building board element are arranged parallel to each other along a second direction, wherein said second direction lies at an angle α to the first direction and along this surface, where $0° < \alpha \leq 90°$, preferably ca. 90°, wherein the elements comprise or consist of interconnected wood fibers or interconnected wood chips or interconnected OSB chips or two or more of these, wherein the lightweight building board elements in the core layer are arranged in at least one first and one second layer and are at least partly adhered together.
2. The core layer according to point 1, wherein the at least one wave peak and the at least one wave trough exist in the form of a second wave; or
    wherein a second undulated profile of a second wave of the undulated lightweight building board element is superimposed onto the first undulated profile so that the wave peaks and wave troughs of the first undulated profile have a further undulation along at least one second direction.
3. The core layer according to point 1 or 2, wherein the shape of the second wave exists in the form of a third wave; or
    wherein a third undulated profile of a third wave is superimposed onto the second undulated profile.
4. The core layer according to one of points 2 and 3, wherein when the first wave expands in the x direction in a Cartesian coordinate system with spatial axes x, y and z, and the oscillation plane of the first wave runs parallel to the x-z plane, the oscillation plane of the first wave runs perpendicular to the oscillation plane of the second wave, wherein the second wave expands in the y direction and its oscillation plane runs parallel to the y-z plane.
5. The core layer according to one of points 2 and 3, wherein when the first wave expands in the x direction in a Cartesian coordinate system with spatial axes x, y and z, and the oscillation plane of the first wave runs parallel to the x-z plane, the oscillation plane of the first wave runs perpendicular to the oscillation plane of the second wave, wherein the second wave expands in the y direction and its oscillation plane runs parallel to the x-y plane.
6. The core layer according to one of points 3 through 5, wherein the oscillation plane of the third wave runs parallel to the y-z plane, wherein the third wave expands in the y direction.
7. The core layer according to one of the preceding points, wherein the first and the second layer both contain a multitude of lightweight building board elements.
8. The core layer according to one of the preceding points, wherein the lightweight building board elements both in the first layer and in the second layer are randomly arranged.
9. The core layer according to one of points 1 through 6, wherein the first and the second layer have only one lightweight building board element each.
10. The core layer according to point 9, wherein the angle between the direction of propagation of the first wave of the lightweight building board element in the first layer and the direction of propagation of the first wave of the lightweight building board element in the second layer is 90°.
11. A multi-layer composite comprising at least a first top layer or a first and a second top layer, a core layer and cavities between the core layer and the top layer or layers, wherein the core layer is adhered to the first top layer or to the first top layer and the second top layer, wherein the core layer is disposed between the first and the second top layers if the multi-layer composite has the second top layer, wherein
    the core layer is a core layer as defined in one of points 1 through 10.
12. A multi-layer composite comprising at least a first top layer or a first and a second top layer, a core layer and cavities between the core layer and the top layer or layers, wherein the core layer has or consists of only one lightweight building board element, wherein said lightweight building board element has the form of a spatially extending first wave, wherein the upper side of the element has at least one wave peak and the lower side of the element has at least one wave trough, wherein the first wave expands transversally or radially, wherein the element comprises or consists of interconnected wood fibers or interconnected wood chips or interconnected OSB chips or two or more of these, wherein the core layer is adhered to the first top layer or to the first top layer and the second top layer, wherein the core layer is disposed between the first and the second top layers if the multi-layer composite has the second top layer,
    provided that the following is excluded: a sandwich element comprising at least two top layers and at least one middle layer, which is disposed between the top layers, in the form of a periodically recurring, double-curved shell structure with principle curvatures in the opposite directions; or
    wherein the lightweight building board element extends along a surface—especially a flat surface—wherein the lightweight building board elements have a first undulated profile of a first wave running along the surface with an elongation that changes along a first direction of propagation, in which wave peaks on the upper side and lower side of the lightweight building board element are arranged parallel to each other along a second direction, wherein said second direction lies at an angle α to the first direction and along this surface, where $0° < \alpha \leq 90°$, preferably ca. 90°, wherein the element comprises or consists of interconnected wood fibers or interconnected wood chips or interconnected OSB chips or two or more of these; wherein the core layer is adhered to the first top layer or to the first top layer and the second top layer, wherein the core layer is disposed between the first and the second top layers if the multi-layer composite has the second top layer;
    provided that the following is excluded: a sandwich element comprising at least two top layers and at least one middle layer, which is disposed between the top layers, in the form of a periodically recurring, double-curved shell structure with principle curvatures in the opposite directions.

13. The multi-layer composite according to point 11 or 12, wherein the first or the second or the first and the second top layers each has two surfaces, which are distanced from each other by a thickness, and the surface that is glued to the core layer is profiled.
14. The multi-layer composite according to one of points 11 through 13, wherein the first top layer or the second top layer or the first top layer and the second top layer independently of each other contain a material selected from: veneer, a wooden board such as a wooden composite board or a solid wood board, chipboard, fiber board, plywood board, a plastic board, plaster board, sheet metal, fiber cement plate, paper or cardboard, and two or more of these.
15. The use
    of a core layer according to one of points 1 through 10; or
    of a multi-layer composite according to one of points 11 through 14;
    in the fields of shell construction, building construction, prefabricated construction, upgrades, interior construction, sound and heat insulation, interior fittings, furniture, doors and door panels, decor and in the construction of automobiles and motor homes, interior finishing of ships and aircraft as well as in packaging technology or as a substitute for corrugated cardboard.

Furthermore, the invention can be expanded to the following points 16 and 17:
16. The core layer according to point 9 or 10, wherein the two lightweight building board elements are separated by a flat element, wherein said flat element is surrounded in a sandwich-like manner by the two lightweight building board elements, and wherein the direction of propagation of the first wave of the lightweight building board element in the first layer and of the first wave of the lightweight building board element in the second layer are identical or different from each other.
17. A core layer having only one lightweight building board element or consisting of lightweight building board element, wherein
    the lightweight building board element has the form of a spatially extending first wave, wherein the upper side of the element has at least one wave peak and the lower side of the element has at least one wave trough, wherein the first wave expands transversally or radially, wherein the element comprises or consists of interconnected wood fibers or interconnected wood chips or interconnected OSB chips or two or more of these; or
    the lightweight building board element extends along a surface—especially a flat surface—wherein the lightweight building board elements have a first undulated profile of a first wave running along the surface with an elongation that changes along a first direction of propagation, in which wave peaks on the upper side and lower side of the lightweight building board element are arranged parallel to each other along a second direction, wherein said second direction lies at an angle $\alpha$ to the first direction and along this surface, where $0°<\alpha\leq90°$, preferably ca. 90°, wherein the element comprises or consists of interconnected wood fibers or interconnected wood chips or interconnected OSB chips or two or more of these.

Furthermore, the invention can be expanded to the following points 1 and 38:
1. A lightweight building board element, wherein the element has the shape of a first spatially extending wave, wherein the upper side of said element has at least one wave peak and the lower side of said element has at least one wave trough,
    wherein the first wave expands transversally or radially, and
    wherein the lightweight building board element contains or consists of OSB chips.
2. A lightweight building board element that extends along a surface—especially a flat surface—wherein the lightweight building board elements have a first undulated profile of a first wave running along the surface with an elongation that changes along a first direction of propagation, in which wave peaks on the upper side and wave troughs on the lower side of the lightweight building board element are arranged parallel to each other along a second direction, wherein said second direction lies at an angle $\alpha$ to the first direction and along this surface, where $0°<\alpha\leq90°$, preferably ca. 90°, and
    wherein the lightweight building board element contains or consists of OSB chips.
3. The lightweight building board element according to point 1, wherein the at least one wave peak and the at least one wave trough exist in the form of a second wave; or
    The lightweight building board element according to point 2, wherein a second undulated profile of a second wave of the undulated lightweight building board element is superimposed onto the first undulated profile so that the wave peaks and wave troughs of the first undulated profile have a further undulation along at least one second direction.
4. The lightweight building board element according to points 1 and 3, wherein the shape of the second wave exists in the form of a third wave; or
    the lightweight building board element according to points 2 and 3, wherein a third undulated profile of a third wave is superimposed onto the second undulated profile.
5. The lightweight building board element according to point 3 or 4, wherein, when the first wave expands in the x direction in a Cartesian coordinate system with spatial axes x, y and z, and the oscillation plane of the first wave runs parallel to the x-z plane, the oscillation plane of the first wave runs perpendicular to the oscillation plane of the second wave, wherein the second wave expands in the y direction and its oscillation plane runs parallel to the y-z plane.
6. The lightweight building board element according to point 3 or 4, wherein, when the first wave expands in the x direction in a Cartesian coordinate system with spatial axes x, y and z, and the oscillation plane of the first wave runs parallel to the x-z plane, the oscillation plane of the first wave runs perpendicular to the oscillation plane of the second wave, wherein the second wave expands in the y direction and its oscillation plane runs parallel to the x-y plane.
7. The lightweight building board element according to one of points 4 through 6, wherein the oscillation plane of the third wave runs parallel to the y-z plane, wherein the third wave expands in the y direction.
8. A lightweight building board element, wherein the element has the shape of a first spatially extending wave, wherein the upper side of said element has at least one wave peak and the lower side of said element has at least one wave trough, wherein the first wave expands transversally or radially, and wherein the at least one wave peak and the at least one wave trough exist in the form of a second wave, and wherein the lightweight building board element contains or consists of bonded wood fibers or bonded wood shavings or bonded wood fibers and wood shavings, and wherein, when the first wave expands in the x direction in a Cartesian coordinate system with spatial axes x, y and z, and the oscillation plane of the first wave runs parallel to the x-z plane, the oscillation plane of the first wave runs perpendicular to the oscillation plane of the second wave, wherein the second wave expands in the y direction and its oscillation plane runs parallel to the x-y plane.

9. A lightweight building board element that extends along a surface—especially a flat surface—wherein the lightweight building board elements have a first undulated profile of a first wave running along the surface with an elongation that changes along a first direction of propagation, in which wave peaks on the upper side and wave troughs on the lower side of the lightweight building board element are arranged parallel to each other along a second direction, wherein said second direction lies at an angle $\alpha$ to the first direction and along this surface, where $0°<\alpha\leq90°$, preferably ca. 90°, and wherein a second undulated profile of a second wave of the undulated lightweight building board element is superimposed onto this first undulated profile so that the wave peaks and wave troughs of the first undulated profile have a further undulation along at least one second direction;

and wherein the lightweight building board element contains or consists of bonded wood fibers or bonded wood shavings or bonded wood fibers and wood shavings;

and wherein, when the first wave expands in the x direction in a Cartesian coordinate system with spatial axes x, y and z, and the oscillation plane of the first wave runs parallel to the x-z plane, the oscillation plane of the first wave runs perpendicular to the oscillation plane of the second wave, wherein the second wave expands in the y direction and its oscillation plane runs parallel to the x-y plane.

10. The lightweight building board element according to point 8, wherein the form of the second wave exists in the form of a third wave, or the lightweight building board according to Claim 9, wherein a third undulated profile of a third wave is superimposed onto the second undulated profile.

11. The lightweight building board element according to point 10, wherein the oscillation plane of the third wave runs parallel to the y-z plane, wherein the third wave expands in the y direction.

12. The lightweight building board element according to one of the preceding points, wherein the first wave or the first and the second wave or the first, the second and the third wave are configured independently of one another as a triangle wave or a triangle-like wave, sinusoidal wave, rectangular wave or saw-tooth wave, or as overlays of two or more of these waves.

13. The lightweight building board element according to one of the preceding points, wherein the element comprises or consists of pressed wood fibers, pressed wood chips or pressed OSC chips or two or more of these.

14. The lightweight building board element according to one of the preceding points, further having an adhesive.

15. A method for producing a lightweight building board element according to one of points 1 through 14, having at least the stages (A) and (B) or (A) and (C):

(A) arranging wood fibers, wood chips or OSC chips or two or more of these such that the fibers and/or chips touch each other;

(B) pressing the touching fibers and/or chips from stage (A) in a pressing tool, wherein said pressing tool is configured such that the undulated element obtained after pressing has the first wave or the second wave or the third wave; or (C) pressing the touching fibers and/or chips from stage (A) in a pressing tool and conducting the pressed fibers and/or chips through a profiling tool, wherein said profiling tool is configured such that the undulated element obtained after passing through it has the first wave or the second wave or the third wave.

16. The method according to point 15, wherein the pressing tool in stage (A) has elevations and depressions that at least partly contact the fibers and/or chips during pressing.

17. The method according to point 15, wherein the profiling tool in stage (C) has profiling rollers.

18. The method according to one of points 15 through 17, wherein the fibers and/or chips are at least partly contacted with an adhesive in stage (A).

19. The method according to one of points 15 through 17, wherein the fibers and/or chips are not contacted with an adhesive in stage (A), i.e. are adhesive-free.

20. A core layer having lightweight building board elements, wherein the elements have the form of a spatially extending first wave, wherein the upper side of the elements has at least one wave peak and the lower side of the elements has at least one wave trough, wherein the first wave expands transversally or radially, wherein the elements comprise or consist of interconnected wood fibers or interconnected wood chips or interconnected OSB chips or two or more of these; or lightweight building board elements that extend along a surface—especially a flat surface—wherein the lightweight building board elements have a first undulated profile of a first wave running along the surface with an elongation that changes along a first direction of propagation, in which wave peaks on the upper side and lower side of the lightweight building board element are arranged parallel to each other along a second direction, wherein said second direction lies at an angle $\alpha$ to the first direction and along this surface, where $0°<\alpha\leq90°$, preferably ca. 90°, wherein the elements comprise or consist of interconnected wood fibers or interconnected wood chips or interconnected OSB chips or two or more of these.

21. A core layer having lightweight building board elements as defined in one of points 1 through 14, or having lightweight building board elements produced according to one of points 15 through 19.

22. The core layer according to point 20 or 21, wherein the lightweight building board elements in the core layer are arranged in at least one first and one second layer and are at least partly adhered to each other.

23. The core layer according to one of points 20 through 22, wherein the first and the second layer both contain a multitude of lightweight building board elements.

24. The core layer according to one of points 20 through 23, wherein the lightweight building board elements both in the first layer and in the second layer are randomly arranged.

25. The core layer according to one of points 20 through 22, wherein the first and the second layer both contain only one lightweight building board element.
26. The core layer according to point 25, wherein the angle between the direction of propagation of the first wave of the lightweight building board element in the first layer and the direction of propagation of the first wave of the lightweight building board element in the second layer is 90°.
27. A method for producing a core layer as in one of points 20 through 26, having at least the stages (D) through (F).
   (D) arranging at least one lightweight building board element, wherein the at least one lightweight building board element forms at first layer;
   (E) arranging at least one second lightweight building board element on the first layer, wherein the at least one element that is arranged on the first layer forms a second layer in such a way that the first and the second layers at least partly form two superimposed layers;
   (F) at least partially adhering the lightweight building board elements to each other.
28. The method according to point 27, further having at least stage (E1):
   (E1) arranging at least one further lightweight building board element on the second layer from stage (E), wherein the at least one lightweight building board element that is arranged on the second layer at least partly forms a third layer in such a way that the second and the third layers at least partly form two superimposed layers.
29. A multi-layer composite comprising at least a first top layer or a first and a second top layer, a core layer and cavities between the core layer and the top layer or layers, wherein
   the core layer is a core layer as defined in one of points 20 through 26;
   or
   the core layer is a core layer as produced according to point 27 or 28;
   wherein the core layer is adhered to the first top layer or to the first top layer and the second top layer, wherein the core layer is disposed between the first and the second top layers if the multi-layer composite has the second top layer;
   or
   wherein the core layer comprises or consists of only one lightweight building board element, wherein the lightweight building board element has the form of a spatially extending first wave, wherein the upper side of the element has at least one wave peak and the lower side of the element has at least one wave trough, wherein the first wave expands transversally or radially, wherein the element comprises or consists of interconnected wood fibers or interconnected wood chips or interconnected OSB chips or two or more of these; or
   wherein the lightweight building board element extends along a surface—especially a flat surface—wherein the lightweight building board elements have a first undulated profile of a first wave running along the surface with an elongation that changes along a first direction of propagation, in which wave peaks on the upper side and lower side of the lightweight building board element are arranged parallel to each other along a second direction, wherein said second direction lies at an angle α to the first direction and along this surface, where 0°<α≤90°, preferably ca. 90°, wherein the element comprises or consists of interconnected wood fibers or interconnected wood chips or interconnected OSB chips or two or more of these;
   wherein the core layer is adhered to the first top layer or to the first top layer and the second top layer, wherein the core layer is disposed between the first and the second top layers if the multi-layer composite has the second top layer;
   provided that the following is excluded: a sandwich element comprising at least two top layers and at least one middle layer, which is disposed between the top layers, in the form of a periodically recurring, double-curved shell structure with principle curvatures in the opposite directions.
30. The multi-layer composite according to point 29, wherein the first or the second or the first and the second top layers each has two surfaces, which are distanced from each other by a thickness, and the surface that is glued to the core layer is profiled.
31. The multi-layer composite according to one of points 29 and 30, wherein the first top layer or the second top layer or the first top layer and the second top layer independently of each other contain a material selected from: veneer, a wooden board such as a wooden composite board or a solid wood board, chipboard, fiber board, plywood board, a plastic board, plaster board, sheet metal, fiber cement plate, paper or cardboard, and two or more of these.
32. A method for producing a multi-layer composite according to one of points 29 through 31, having at least the stages (G) through (J):
   (G) arranging at least one lightweight building board element on the first top layer such that the lightweight building board element on the first top layer forms a first layer;
   (H) arranging at least one second lightweight building board element on the first layer, wherein the lightweight building board element that is arranged on the first layer forms a second layer in such a way that the first and the second layers at least partly form two superimposed layers;
   (I) at least partially adhering the first top layer with the at least one lightweight building board element of the first layer; and
   (J) at least partially adhering the at least one lightweight building board element of the first layer with the at least one lightweight building board element of the second layer.
33. The method according to point 32, further having at least stage (H1):
   (H1) arranging at least one further lightweight building board element on the second layer from stage (H), wherein the at least one lightweight building board element that is arranged on the second layer at least partly forms a third layer in such a way that the second and the third layers at least partly form two superimposed layers.
34. The method according to point 32 or 33, further having at least stage (K):
   (K) arranging a second top layer on the second layer from stage (H) or the third layer from stage (H1) and at least partly adhering the second top layer to the at least one lightweight building board element of the second layer or the third layer, wherein the adhering in stage (K) can take place simultaneously with the adhering in stage (I) or (J) or stages (I) and (J) or afterward.

35. A method for producing a multi-layer composite according to one of points 29 through 31, having at least the stages (R) through (T):
(R) arranging the core layer on the first top layer as defined in one of Claims 20 through 26 or produced by a method as defined in Claim 27 or 28;
(S) optionally arranging a second top layer on the core layer from stage (R);
(T) at least partially adhering the first top layer and the optional second top layer to the core layer.

36. A deformed core layer having lightweight building board elements as defined in one of points 1 through 14, or having lightweight building board elements produced according to one of points 15 through 19, wherein the lightweight building board elements are at least partly deformed and can be produced by a method at least comprising stage (U):
(U) compression-deforming the core layer according to one of points 20 through 26 or the core layer produced according to one of points 27 and 28.

37. A deformed multi-layer composite comprising at least a first top layer and optionally a second top layer, wherein the core layer is a core layer as defined in one of points 20 through 26, or is a core layer as produced in one of points 27 and 28, wherein the core layer is adhered to the first top layer or with the first and the second top layer, wherein the core layer is disposed between the first and the second top layers if the multi-layer composite has the second top layer, wherein the core layer and the first top layer or the first and the second top layer are at least partly deformed, at least having stage (V):
(V) compression-deforming the multi-layer composite according to one of points 29 through 31 or the multi-layer composite produced according to one of points 32 and 35.

38. The use of
a lightweight building board element as defined in one of points 1 through 14, or of a lightweight building board element produced according to one of points 15 through 19; or
a core layer according to one of points 20 through 26 or a core layer produced according to one of points 27 and 28; or
a multi-layer composite according to one of points 29 through 31 or a multi-layer composite produced according to one of points 32 and 35; or
a deformed core layer according to point 36; or
a deformed multi-layer composite according to point 37;
in the fields of shell construction, building construction, prefabricated construction, upgrades, interior construction, sound and heat insulation, interior fittings, furniture, doors and door panels, decor and in the construction of automobiles and motor homes, interior finishing of ships and aircraft as well as in packaging technology or as a substitute for corrugated cardboard.

The lightweight building elements according to the invention have the advantage in particular that, in contrast to known elements, the nearly parallel wave peaks and/or wave troughs of adjacent elements are prevented from intermeshing, or this is at least largely suppressed, owing to a random distribution in the core layer. However, intermeshing reduces the intended lightweight construction effect. This can be largely, if not completely, avoided by using the elements according to the invention.

The terms used below in quotation marks are defined within the meaning of the invention.

DETAILED DESCRIPTION OF THE INVENTION

First Aspect: Lightweight Building Board Elements

Figure 1:
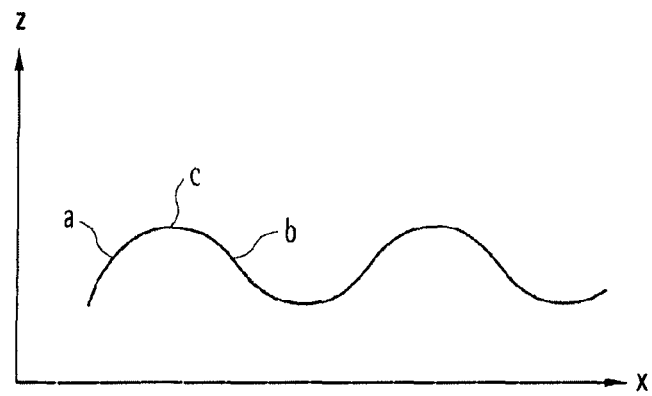
FIG. 1 a schematic side view of an undulated element, i.e. a lightweight building board element according to the invention, having at least one wave, in this case a sinusoidal wave.

An element (undulated lightweight building board element), which can be used to produce core layers and multi-layer composites according to the invention, has the form of a spatially extending first wave in one embodiment, wherein the upper side of the element has at least one wave peak and the lower side of the element has at least one wave trough, wherein the first wave expands transversally or radially, and wherein the lightweight building board element comprises or consists of interconnected wood fibers or interconnected wood chips or interconnected OSB chips or two or more of these.

In a further embodiment, the element is provided such that it extends along a surface—especially a flat surface— wherein the element has a first undulated profile of a first wave running along the surface with an elongation that changes along a first direction of propagation, in which wave peaks on the upper side and wave troughs on the lower side of the element are arranged parallel to each other along a second direction, wherein said second direction lies at an angle $\alpha$ to the first direction and along this surface, where $0°<\alpha \leq 90°$, preferably ca. $90°$, wherein the element comprises or consists of interconnected wood fibers or interconnected wood chips or interconnected OSB chips.

Therefore, both the upper side and the lower side of the element are a component of a wave. The wave peaks are located on the upper side and the associated wave troughs are located on the lower side. The wave peaks can also be called wave crests.

The term "element" refers to a part or a component of the core layer according to the invention or of the multi-layer composite according to the invention in the form of a lightweight building board. Hereafter, this element will also be identified as a lightweight building board element or an undulated lightweight building board element.

The term "wave" in the element is exemplified in the physical sense by a spatially expanding oscillation. In their broadest meaning, the terms "wave" or "wave structure" or "undulated" or "wavy" describe at least one wave peak and one wave trough in the wave. Thus the wave has at least one positive and negative half-wave in the mathematical sense.

The terms used here also include recurring undulated structural units in the element.

The wave can be characterized in the mathematical sense by the elongation of the oscillation by the amplitude of the oscillation and by the oscillation plane of the positive or negative half-wave, i.e. the wave peak and the wave trough. A characterization based on wavelength, i.e. using the length of a wave peak and the subsequent wave trough, is likewise possible. The transition between a wave peak and a wave trough can—depending upon the shape of the wave—be characterized by a reversal point in the undulated profile and by a straight section.

The wave can be varied with regard to its amplitude or wavelength or amplitude and wavelength. In this way, the thickness of the core layer in the lightweight building board can likewise be influenced along with its rigidity. On the other hand, it is also possible to influence the rigidity of the lightweight building board using board parameters such as the thickness of the wave, i.e. the thickness of the undulated or wavy element in the lightweight building board, the chip and fiber geometry in the element, the concentration of the elements in the board and the degree of sizing of the elements among one another and with the top layers.

The wave can be a wave that expands or runs both transversally (in a straight line) or radially.

The shape of the wave can thus take on any conceivable structure.

In one embodiment, the wave is formed in the shape of a sinus function or a function similar to a sinus function, i.e. it exists in the form of a sinus function and/or is sinusoidal. Hereafter, the terms "sinus-shaped" or "sinusoidal" will be employed synonymously.

In a further embodiment, the wave is configured in the form of a triangle wave. The term "triangle wave" also includes the term "triangle-like wave".

In a further embodiment, the wave is configured in the form of a saw-tooth wave. A wave such as this can also be called a tilting vibration.

In a further embodiment, the wave is configured in the form of a rectangular wave.

The stated wave forms are known in the field of physics and can also be described mathematically.

In a further embodiment, the wave has different wave forms, i.e. at least two or three or four waveforms, selected from: triangle wave, sinusoidal wave, saw-tooth wave or rectangular wave.

In one embodiment, these waves can be arranged in any desired order along a common direction of propagation in the undulated element.

In a further embodiment, two or more of the aforementioned wave types can also overlap in a common direction of propagation and form a suitably new wave form.

For example, a trapezoidal wave can result from the appropriate overlapping.

The wave form in the undulated element can also be described in that the undulated element in the form of a lightweight building board element has platelet-like regions, wherein one platelet-like region in the undulated element and an adjacent platelet-like region in the undulated element together form a common edge between them in such a way that the element has an undulated configuration. In this way, the platelet-like regions, including the edge, form a wave.

The term "platelet-like regions" includes regions that are configured in the form of surfaces. The surfaces can be level, i.e. flat, or uneven, i.e. not flat, preferably curved in that case, preferably convex or concave, or corrugated.

The term "edge" includes terms such as "transition area between two adjacent platelet-like regions". This transition area can be an edge that is sharply defined. The term also includes an edge that is configured as a curved edge or as a flat (level) edge. The term "edge" thus includes a sharp edge in the form of a line as well as a wavy or undulating edge in the form of a curvy plane or a curved region between two platelet-like regions. In this way, the platelet-like regions in the undulated element form an undulated structure, i.e. a wave peak follows a wave trough and vice versa.

Preferably, edges that are formed by adjacent platelet-like regions in the undulated element are oriented parallel to each other.

The term "curved surface" means a convex surface or a concave surface or a surface that has both a convex and a concave portion. In particular, the term "curved" also means "continuously curved".

Thus an undulated element having platelet-like regions is also disclosed, wherein one platelet-like region in the undulated element and an adjacent platelet-like region in the undulated element together form a common edge between them in such a way that the element has an undulated configuration, wherein (a) the platelet-like regions are flat surfaces, and the edge formed between the flat surfaces is a line. A wave such as this can be described as a zig-zag wave; or (b) the platelet-like regions are flat surfaces, and the edge formed between the flat surfaces is a curved surface; or (c) the platelet-like regions are flat surfaces, and the edge formed between the flat surfaces is a flat surface; or (d) the platelet-like regions are curved surfaces, and the edge formed between the curved surfaces is a curved surface, preferably a convex surface; or (d) the platelet-like regions are curved surfaces, and the edge formed between the curved surfaces is straight; or (f) the platelet-like regions are curved surfaces, and the edge formed between the curved surfaces is a flat surface.

In one embodiment, the wave has at least one or two or three or four or five or six of wave forms (a) through (f).

In one embodiment, the element is formed from:

(c') an element (c) such that the wave, as viewed in the longitudinal section, has repeating units in the form of a trapezoid; or (d') elements (d) such that the wave, as viewed in the longitudinal section, has repeating units in the form of a sinus function or a sinusoidal function.

The good compressive strength and resistance and good shear strength and resistance of elements (a) through (f) and/or of a core layer containing said elements or a multi-layer composite containing the core layer can still be significantly improved if the core layer contains or consists in particular of elements (d').

Wave forms such as this are known and are described in documents EP 2 660 408 A1 and WO 2015/067362. Therefore, express reference to these documents is made for further explanation.

In one inventive embodiment, the at least one positive and negative half-waves, i.e. the wave peak and the wave trough, exist at least in part in the form of a second wave or have a second wave superimposed upon them.

This also means that the first wave and thus the lightweight building board element are deformed or warped to form the second wave.

The shape of the second wave can be selected without regard for the shape of the first wave from among the forms that are described above with reference to the first wave.

In one embodiment, when the first wave expands in the x direction in a Cartesian coordinate system with spatial axes x, y and z, and the oscillation plane runs in or parallel to the x-z plane, the oscillation plane of the first wave runs perpendicular to the oscillation plane of the second wave, wherein the second wave expands in the y direction and the oscillation plane runs in or parallel to the x-z plane.

In one embodiment, the embodiment described above is excluded. For example, the waves of the shell structure with principle curvatures in the opposite directions defined in EP 1 758 733 B1 are characterized in this way.

In one preferred embodiment, when the first wave expands in the x direction in a Cartesian coordinate system with spatial axes x, y and z, and the oscillation plane runs in or parallel to the x-z plane, the oscillation plane of the first wave runs perpendicular to the oscillation plane of the second wave, wherein the second wave expands in the y direction and the oscillation plane runs in or parallel to the x-y plane.

In a further preferred embodiment, the shape of the second wave exists in the form of a third wave. This means that the second wave and thus the lightweight building board element are deformed and warped to form the third wave.

A third wave is thereby superimposed onto the second wave and thus the first wave.

Of course, it is also conceivable to superimpose a fourth wave onto the third wave and thus also onto the first and second waves, or to superimpose a fifth wave onto the fourth wave itself and thus also onto the first, second and third waves, and so forth.

The shape of the third wave can be selected without regard for the shape of the first wave and the second from among the forms that are described above with reference to the first wave and the second wave.

Preferably, the oscillation plane of the third wave run parallel to the oscillation plane of the first wave.

In a further embodiment, the oscillation plane of the first wave and the oscillation plane of the second wave run perpendicular to each other, wherein the oscillation plane of the third wave runs parallel to the oscillation plane of the first wave.

In one preferred embodiment, when the first wave expands in the x direction in a Cartesian coordinate system with spatial axes x, y and z, and the oscillation plane runs in or parallel to the x-z plane, the oscillation plane of the first wave runs perpendicular to the oscillation plane of the second wave, wherein the second wave expands in the y direction and the oscillation plane runs in or parallel to the x-y plane, and the oscillation plane of the third wave lies in or parallel to the y-z plane, wherein the third wave expands in the y direction.

The stability of the elements and thus the stability of the lightweight building board can be further improved by an embodiment such as this. This type of element exhibits relatively high rigidity, since a kind of "reinforcing ribs" is created in the element. Additionally, the triple corrugation further reduces the probability of the intermeshing of wave peaks and wave troughs of adjacent superimposed elements during the production of the lightweight building board if these elements have the same or similar basic orientation.

The undulated element comprises or consists of interconnected fibers or interconnected chips or interconnected fibers and chips.

The term "fiber" refers to a structure that is thin and flexible in relation to its length. The ratio of length to diameter can preferably lie between 3:1 and 10:1. Depending upon the requirements of the lightweight building board element and the type of fiber used, however, other ratios can be set, such as in the range from 15:1 to 100:1.

All materials that can form fibers can be employed.

For instance, fibers can be selected from the group consisting of: wood fibers, vegetable fibers, animal fibers, fibers of natural polymers and fibers of synthetic polymers or a combination of two or more of these.

Fibers of this type are known in the prior art.

The fibers can have the same or similar dimensions and can also be differently dimensioned. The physical properties of the elements can be further influenced by an appropriate selection of dimensions.

In one embodiment, the fibers are wood fibers.

The term "wood fibers" refers to elongated, axially arranged wood cells that serve to stabilize the wood. The term "wood fibers" is used synonymously with the terms "wood pulp" and "cellulose". Wood fibers can be characterized by their arrangement, the shape, the wall thickness and thickening as well as their length. The term "wood fibers" includes both softwood and hardwood fibers. The former are usually longer than hardwood fibers. Typical values are 3.5-6 mm for spruce, pine or fir fibers and 1-1.5 mm for poplar, birch or beech fibers. The slenderness ratio (ratio of length to thickness) in the softwood fibers is approximately 15:1 to 100:1 and in the hardwood fibers approximately 15:1 to 60:1. The fibers are obtained by known methods, usually from debarked wood chips. Individual fibers, fiber bundles and fiber fragments can be obtained by steaming, boiling and chemical or mechanical maceration.

The term "chip" refers to a particle that has been mechanically separated from a processed workpiece by means of a tool. The chip shape describes the shape of the chip after leaving the tool. They range from long ribbon and thread chips to spiral chips to short segmental chips. These terms are familiar to a person skilled in the art.

All materials that can form chips can be employed.

Chips of this type are known in the prior art.

The chips can have the same or similar dimensions and can also be differently dimensioned. The physical properties of the elements can be further influenced by an appropriate selection of dimensions.

In one embodiment, the chips are wood chips.

Wood chips are by-products and waste products from the machining of wood in sawmills and in other fields of the wood-processing industry and in the home environment. Wood chips are usually called "sawdust" when produced by sawing and "wood shavings" when produced by planing.

In one embodiment, the chips are OSB chips, which are also known in the prior art as "OSB strands". As is well known, these chips are cut out of debarked round timber in the longitudinal direction by rotating blades. Suitable chips are generally approximately 100 mm-200 mm long, 10-50 mm wide and 0.1-1.5 mm thick. However, it is also possible to use OSC chips with dimensions that deviate from these. One embodiment uses OSC chips that are 15 to 25 mm long, 3 to 8 mm wide and 0.1 mm to 0.5 mm thick, preferably chips with a length of 20 mm, a width of 5 mm and a thickness of 0.2 mm.

In one embodiment, the lightweight building board element comprises or consists of pressed wood fibers or pressed wood chips or pressed OSB strands or two or more of these.

In a further embodiment, the lightweight building board element can comprise an adhesive. By means of the adhesive, the fibers or chips or fibers and chips can be interconnected to increase strength.

In one embodiment, the lightweight building board element is not glued. The term "not glued" means that the lightweight building board element is composed or consists of wood fibers or wood chips or wood fibers and wood chips that are not glued together. Therefore, the lightweight building board element consists exclusively of wood fibers or wood chips or wood fibers and wood chips. The interior of the lightweight building board element thus has no adhesive or glue that would typically be used in the wood industry to adhere wood. Known adhesives of this type are based on gluten, casein, urea-formaldehyde, phenol-formaldehyde, resorcinol-formaldehyde, melamine-formaldehyde, polyvinyl acetate and/or polyurethane. The use of non-glued elements is advantageous for environmental and economic reasons.

The invention also discloses and relates to a lightweight building board element, wherein the element has the shape of a first spatially extending wave, wherein the upper side of said element has at least one wave peak and the lower side of said element has at least one wave trough,
wherein the first wave expands transversally or radially, and wherein the at least one wave peak and the at least one wave trough exist in the form of a second wave, and
wherein the lightweight building board element contains or consists of bonded wood fibers or bonded wood shavings or bonded OSB chips or two or more of these.

The phrase "two or more of these" means wood fibers and wood chips or wood fibers and OSB chips or wood chips and OSB chips or wood fibers and wood chip and OSC chips.

Furthermore, the invention discloses or relates to lightweight building board element that extends along a surface—especially a flat surface—wherein the lightweight building board elements have a first undulated profile of a first wave running along the surface with an elongation that changes along a first direction of propagation, in which wave peaks on the upper side and lower side of the lightweight building board element are arranged parallel to each other along a second direction, wherein said second direction lies at an angle α to the first direction and along this surface, where 0°<α≤90°, preferably ca. 90°, and wherein a second undulated profile of a second wave of the undulated lightweight building board element is superimposed onto this first undulated profile so that the wave peaks of the first undulated profile have a further undulation along at least one second direction;
and wherein the lightweight building board element contains or consists of bonded wood fibers or bonded wood shavings or bonded OSB chips or two or more of these.

Second Aspect: Production of Undulated Elements

Lightweight building board elements that are useful for the invention as defined in the first aspect can generally be produced by a method having at least the stages (A) and (B) or (A) and (C):

(A) arranging wood fibers, wood chips or OSC chips or two or more of these such that the fibers and/or chips touch each other;
(B) pressing the touching fibers and/or chips from stage (A) in a pressing tool, wherein said pressing tool is configured such that the undulated element obtained after pressing has the first wave or the second wave or the third wave; or
(C) pressing the touching fibers and/or chips from stage (A) in a pressing tool and conducting the pressed fibers and/or chips through a profiling tool, wherein said profiling tool is configured such that the lightweight building board element obtained after passing through it has the first wave or the second wave or the third wave.

Thus the element obtained in stage (B) or (C) can have the first wave, the first wave superimposed with the second wave or the first wave superimposed with the third wave, wherein the second wave is itself superimposed with the third wave.

In one embodiment, it is possible to arrange the chips and/or fibers in the pressing tool in stage (A). Here, stage (A) includes stage (A1), and stage (B) includes stage (B1):

(A1) arranging wood fibers, wood chips or OSC chips or two or more of these such that the fibers and/or chips touch each other, wherein the fibers or chips or fibers and chips are arranged in a pressing tool;
(B1) pressing the touching fibers and/or chips from stage (A1) in the pressing tool, wherein said pressing tool is configured such that the undulated element obtained after pressing has the first wave or the second wave or the third wave.

In a further embodiment, it is possible to arrange the fibers or chips or fibers and chips in stage (A) in such a way that the fibers and/or chips touch each other, and to press them flat or level and then provide the pressed material to stage (B).

Accordingly, stage (A) includes stage (A2), and stage (B) includes stage (B2):

(A2) arranging wood fibers, wood chips or OSC chips or two or more of these such that the fibers and/or chips touch each other, wherein the fibers or chips or fibers and chips are pressed such that a flat arrangement is formed;
(B2) pressing the pressed fibers and/or chips from stage (A2) in a pressing tool, wherein said pressing tool is configured such that the undulated element obtained after pressing has the first wave or the second wave or the third wave.

The lightweight building board elements according to the invention can be produced by a method having at least the stages (A) and (B) or (A) and (C):

(A) arranging wood fibers or wood chips or OSC chips or two or more of these such that the fibers and/or chips touch each other;
(B) pressing the touching fibers and/or chips from stage (A) in a pressing tool, wherein said pressing tool is configured such that the lightweight building board element obtained after pressing has the first wave or the second wave or the third wave; or
(C) pressing the touching fibers and/or chips from stage (A) in a pressing tool and conducting the pressed fibers and/or chips through a profiling tool, wherein said profiling tool is configured such that the lightweight building board element obtained after passing through it has the first wave or the second wave or the third wave.

Accordingly, in this embodiment, a pre-compression of the fibers or chips takes place in the pressing tool of stages (A2) and (C) before the corrugation is carried out.

The wood fibers and wood chips or OSB chips used in stage (A) in the production of the lightweight building element according to the invention accumulate, for example, in the wood-processing industry.

The OSB chips can also exist at least partly in an agglomerated form, preferably in the form of OSB boards or in the form of fragments of OSB board. However, these boards or fragments of boards should be only ca. 1 mm thick in order to be easily processed into a wavy element in a pressing tool.

The strength that can be achieved with OSB chips, which can be characterized by determining the modulus of elasticity, is high.

In one embodiment, wherein the pressing tool in stage (B) has elevations and depressions that at least partly contact the fibers and/or chips during pressing. The first wave as well as the second and, if applicable, the third wave of the lightweight building board element according to the invention can be formed, preferably impressed, by means of suitable elevations and depressions.

Suitable pressing devices and methods for forming elements having a wave are known from EP 2 488 337 B1, for example. Suitable pressing devices for producing the lightweight building board element according to the invention can be formed accordingly.

In one embodiment, the pressing tool in stage (B) does not have any elevations or depressions. In this instance, no wave structure is impressed into the fibers or chips. In stage (C), they can be passed through a suitable profiling tool, which then creates the wave structure.

In one embodiment, the profiling tool in stage (C) has one or more profiling rollers. The waves of the lightweight building board element according to the invention can be formed by means of suitable profiling rollers.

The pressures exerted during pressing can be adapted to the requirements. In one embodiment, the pressure is in the range from 5 to 15 MPa. Higher or lower pressures can be used in other embodiments.

In one embodiment, the fibers and/or chips can be at least partly contacted with an adhesive in stage (A). The stability of the elements can be further increased in this way.

In another embodiment, the fibers and/or chips are not contacted with an adhesive in stage (A), i.e. they are adhesive-free. These types of adhesive-free lightweight building board elements also generally already exhibit good stability.

There are no restrictions on the dimensions of the element produced by the method. Round or rounded lightweight building board elements as well as polygonal lightweight building board elements can be produced.

Preferably, rectangular lightweight building board elements are produced, which are defined over a length and a breadth.

In one embodiment, in stage (B) or (C) pressed fibers and/or pressed chips are used, which are dimensioned such that the ratio of length to width of the manufactured lightweight building board element lies in the range of 2:1 to 50:1, more preferably in the range from 2:1 to 40:1.

In one embodiment, the lightweight building board element has a product with a length×width in the range of the 10 mm×5 mm to 3000 mm×1000 mm.

Thus relatively small lightweight building board elements as well as strip-like lightweight building board elements can be produced in one embodiment.

In a further embodiment, relatively large lightweight building board elements that are preferably strip-like can be subjected to a fragmentation step if relatively small lightweight building board elements are supposed to be made from these strip-like elements.

Relatively small lightweight building board elements preferably have a product with a length×width in the range from 10×5 mm to 200×100 mm, more preferably 10×5 mm to 100×50 mm, even more preferably 10×5 mm to 50×25 mm. The term "length" means the shortest distance between the beginning and end of the undulated element in the longitudinal direction of said element. The term "width" means the distance between the lateral edges transverse to the longitudinal direction of the element.

Preferably, fibers and/or chips are employed in stage (A) that are dimensioned such that the element according to stage (B) or (C) obtained by the method has a thickness in the range from 0.1 to 5 mm, preferably 0.2 mm to 3.5 mm, more preferably 0.2 mm to 2 mm.

The term "thickness" means the smallest distance between two opposing surfaces of the undulated element. These surfaces are spaced apart by the thickness of the platelet-like region or the edge.

The thickness of the corrugated web does not necessarily have to be the same at all points on the wave. It is possible for the wave peaks and wave troughs and/or the straight sections between the wave peaks and wave troughs to have different thicknesses. Depending upon the pressing technique employed, it is also possible that regions of different thicknesses occur in the wave.

Preferably, the method is carried out in such a way that the depressions and elevations of the pressing tool in stage (B) and/or the profile of the profiled tool in stage (C) are selected such that the wave height of the lightweight building board element lies in the range from 1 to 20 mm, preferably 2 to 12 mm, more preferably 2 to 8 mm.

The term "wave height" in this instance means the smallest distance between two imaginary parallel planes, between which the undulated element can be arranged in such a way that the wave lies between these planes.

In an especially preferred embodiment, the thickness of the undulated element lies in the range from 0.2 to 5 mm and the wave height lies in the range from 2 to 15 mm.

In a further especially preferred embodiment, the thickness of the undulated element lies in the range from 0.2 to 2 mm and the wave height lies in the range from 2 to 8 mm.

In one embodiment, the wavelength, i.e. the sum of the length of a positive half-wave and the length of the adjacent negative half-wave, lies in the range from 5 mm to 200 mm, preferably 5 mm to 20 mm, more preferably 5 mm to 10 mm.

In an especially preferred embodiment, the thickness of the undulated element lies in the range from 0.2 to 5 mm, the wave height lies in the range from 2 to 15 mm and the wavelength lies in the range from 5 mm to 20 mm.

In a further preferred embodiment, the opening angle of a wave peak or wave trough, i.e. of a half-wave, is 30° to 120°, preferably 40° to 100°, more preferably 50° to 90° and even more preferably 60° to 90°. An especially preferred opening angle is 70°.

In another especially preferred embodiment, the thickness of the undulated element lies in the range from 0.2 to 5 mm, the wave height lies in the range from 2 to 15 mm, the wavelength lies in the range from 5 to 20 mm and the opening angle lies in the range from 60° to 90°.

The term "opening angle" or "opening angle of a half-wave" is the angle formed by two intersecting imaginary lines, each of which is applied tangentially to a wave peak or wave trough, i.e. to the half-waves, wherein the point of intersection of the imaginary lines is located on the elongated amplitude of the wave peak or wave trough (half-wave).

When an opening angle such as this occurs, the weight of the lightweight building board element can be as low as possible and the mechanical strength of the element can be kept as high as possible. Accordingly, core layers and/or multi-layer composites produced by means of lightweight building board elements of this kind also have a balanced ratio between a lowest possible weight (low bulk density) and a highest possible mechanical strength (load-bearing capacity). The mechanical strength (resistance, load-bearing capacity) can preferably be calculated by determining the modulus of elasticity.

The lightweight building board elements produced by the method preferably have a bulk density in the range from 150 to 430 kg/m$^3$. Moduli of elasticity preferably fall within the range from 2,000 to 7,000 N/mm$^2$.

The undulated elements exhibit an excellent load-bearing capacity, and so they can be used as or for a loosened core layer and/or in multi-layer composites with a loosened core layer, which themselves allow for a high load-bearing capacity with a relatively low density.

Third Aspect: Core Layer with Undulated Elements

Core layers such as those disclosed herein comprise lightweight building board elements as defined in the first aspect or they comprise lightweight building board elements produced by a method as defined in the second aspect.

The term "core layer" means a layer that, in addition to the lightweight building board elements according to the invention, also has cavities, i.e. a loosened structure.

The term "layer" is used synonymously with the term "ply".

In one embodiment, the lightweight building board elements in the core layer are arranged in at least one first and one second layer and are at least partly adhered to each other.

In a further embodiment, the at least one first and the second layer both contain a multitude of lightweight building board elements.

In one embodiment, the lightweight building board elements can also be arranged next to each other or one above the other or next to each other and one above the other in the first and second layer.

In one embodiment, the lightweight building board elements in the at least one first layer and in the second layer are at least partly randomly arranged. This embodiment is advantageous in particular when the lightweight building board elements have relatively small dimensions.

In one embodiment, the at least one first layer has only one lightweight building board element, and the second layer of the core layer has more than one lightweight building board element, wherein the lightweight building board elements in the second layer are arranged next to each other. Preferably, a strip-like lightweight building board element is then used in the first layer in this embodiment.

In a further preferred embodiment, the at least one first and the second layer of the core layer each contains only one lightweight building board element. Preferably, strip-like lightweight building board elements are then used in this embodiment.

In this embodiment, the angle between the first direction of the first wave in the first layer and the first direction of the first wave in the second layer can be 90°. The term "angle of 90°" also allows for deviations of ±10°.

In a further embodiment, the deviation from the 90° angle can be not only ±10° but also up to ±20°, ±30° or ±40°.

In a further embodiment, the direction of propagation of the first wave of the first lightweight building board element in the first layer is different from the direction of propagation of the first wave of the lightweight building board element in the second layer.

In one embodiment, the core layer has flat elements in addition to the undulated lightweight building board elements. The term "flat" includes terms such as "planar" or "formed or configured flat" or "formed or configured planar". These flat elements can be selected from the materials described below for top layers, i.e. from: veneer, a wooden board such as a wooden composite board or a solid wood board, chipboard, fiber board, plywood board, a plastic board, plaster board, sheet metal, fiber cement plate, paper and cardboard, and two or more of these.

These flat elements can be the same length and width as the undulated lightweight building board elements, but they can also be different.

The flat elements can be connected to the wave peaks and/or wave troughs of the undulated lightweight building board elements, preferably adhered. If undulated lightweight building board elements are adhered to said flat elements, then inner cohesion of the core layer can be further improved.

In one embodiment, undulated lightweight building board elements and undulated lightweight building board elements that are adhered to flat elements are arranged randomly in the core layer.

In one embodiment, the invention relates to a core layer, wherein the core layer contains a sequence of an undulated lightweight building board element, a flat element and then another undulated lightweight building board element. In this embodiment, each of the first layer and the second layer has an undulated lightweight building board element, wherein the two undulated lightweight building board elements are separated from each other by the flat element. Preferably, the flat element is then surrounded in a sandwich-like manner by the two undulated lightweight building board elements.

The direction of propagation of the first wave of the undulated lightweight building board elements in the first layer and the second layer can then be the same or different in this arrangement.

In a further embodiment, the invention also relates to a core layer, wherein the core layer consists of only one undulated lightweight building board element or comprises only one undulated lightweight building board element.

Fourth Aspect: Method for Producing a Core Layer as Defined in the Third Aspect

In the fourth aspect, the invention relates to a method for producing a core layer as defined in third aspect, having at least stages (D) through (F):

(D) arranging at least one lightweight building board element as defined in the first aspect or produced by a method as defined in the second aspect, wherein the at least one undulated element forms a first layer;

(E) arranging at least one second lightweight building board element as defined in the first aspect or produced by a method as defined in the second aspect on the first layer, wherein the at least one lightweight building board element that is arranged on the first layer forms a second layer in such a way that the first and the second layers at least partly form two superimposed layers;

(F) at least partially adhering the lightweight building board elements to each other.

The at least one lightweight building board element is arranged on a suitable support in stage (D). The support is preferably a material with a flat surface, on which the element or elements can be arranged.

The method can further include at least stage (E1):

(E1) arranging at least one further lightweight building board element as defined in the first aspect or produced by a method as defined in the second aspect on the second layer from stage (E), wherein the at least one lightweight building board element that is arranged on the second layer at least partly forms a third layer in such a way that the second and the third layers at least partly form two superimposed layers.

The fixed connection in stage (F) can be facilitated by applying pressure. Said pressure preferably lies in the range of 0.02 MPa to 4.0 MPa, more preferably in the range from 0.01 to 3.0 MPa.

Fifth Aspect: Multi-Layer Composite

In a fifth aspect, the invention relates to a multi-layer composite comprising at least a first top layer or a first and a second top layer as well as a core layer, wherein the core layer is a core layer as defined in the third aspect or a core layer produced as in the fourth aspect, wherein the core layer is adhered to the first top layer or to the first top layer and the second top layer, wherein the core layer is disposed between the first and the second top layers if the multi-layer composite has the second top layer.

The first top layer or the first and the second top layer are thus flatly adhered to the core layer.

In one embodiment, the first or the second or the first and the second top layers each has two sides, which are distanced from each other by a thickness, and the side that is adhered to the at least one inventive element is profiled.

The profile can exist in a wave structure. The profile can be introduced into the top layer by means of suitable tools.

This offers the advantage that further cavities can be introduced into the multi-layer composite to save weight without thereby influencing the stability of the composite too disadvantageously.

Preferably, the first top layer or the second top layer or the first top layer and the second top layer independently of each other contain a material selected from: veneer, a wooden board such as a wooden composite board or a solid wood board, chipboard, fiber board, plywood board, a plastic board, plaster board, sheet metal, fiber cement plate, paper or cardboard, and two or more of these.

If a fiberboard is used as the top layer, then it can be a medium-density fiberboard (MDF) or a high-density fiberboard (HDF). MDF and HDF boards are known in the prior art.

Preferably, at least one top layer is flat, i.e. planar.

The top layers are not limited in their shape.

Preferably, at least one top layer has a square or rectangular shape.

The dimensions of the top layer are not limited.

Preferably, the width and length of the rectangular shapes are in the range from 0.50 m to 5 m, more preferably in the range from 1 to 3 m.

In a further embodiment, the multi-layer composite has a core layer that comprises or consists of only one undulated lightweight building element.

Accordingly, the invention also relates to a multi-layer composite comprising at least a first top layer or a first and a second top layer, a core layer and cavities between the core layer and the top layer or layers, wherein the core layer comprises or consists of only one lightweight building board element as defined in the first aspect or one lightweight building board element produced by a method as defined in the second aspect, wherein the core layer is adhered to the first top layer or to the first top layer and the second top layer, wherein the core layer is disposed between the first and the second top layers if the multi-layer composite has the second top layer.

In one embodiment, the multi-layer composite in the form of a sandwich element, which is defined in EP 1 758 733 B1, is ruled out.

Accordingly, in one embodiment the invention relates to a multi-layer composite comprising at least a first top layer or a first and a second top layer, a core layer and cavities between the core layer and the top layer or layers, wherein the core layer comprises or consists of only one lightweight building board element as defined in the first aspect or one lightweight building board element produced by a method as defined in the second aspect, wherein the core layer is adhered to the first top layer or to the first top layer and the second top layer, wherein the core layer is disposed between the first and the second top layers if the multi-layer composite has the second top layer, provided that the following is excluded: a sandwich element comprising at least two top layers and at least one middle layer, which is disposed between the top layers, in the form of a periodically recurring, double-curved shell structure with principle curvatures in the opposite directions.

Sixth Aspect: Production of a Multi-Layer Composite

In the sixth aspect, the invention relates to a method for producing a multi-layer composite as defined in fifth aspect, having at least stages (G) through (J):

(G) arranging at least one lightweight building board element as defined in the first aspect or produced by a method as defined in the second aspect on the first top layer such that the lightweight building board element on the first top layer forms at the first layer;

(H) arranging at least one second lightweight building board element as defined in the first aspect or produced by a method as defined in the second aspect on the first layer, wherein the lightweight building board element that is arranged on the first layer forms a second layer in such a way that the first and the second layers at least partly form two superimposed layers;

(I) at least partially adhering the first top layer with the at least one undulated element of the first layer; and (J) at least partially adhering the at least one lightweight building board element of the first layer with the at least one lightweight building board element of the second layer.

In one embodiment, the method includes at least stage (H1):

(H1) arranging at least one further lightweight building board element as defined in the first aspect or produced by a method as defined in the second aspect on the second layer from stage (H), wherein the at least one lightweight building board element that is arranged on the second layer at least partly forms a third layer in such a way that the second and the third layers at least partly form two superimposed layers.

In a further embodiment, the method further includes at least stage (K):

(K) arranging a second top layer on the second layer from stage (H) or the third layer from stage (H1) and at least partly adhering the second top layer to the at least one lightweight building board element of the second layer or the third layer, wherein the adhering in stage (K) can take place simultaneously with the adhering in stage (I) or (J) or stages (I) and (J) or afterward.

Alternatively to this method, the method can also include at least stages (R) through (T):

(R) arranging the core layer on the first top layer as defined in the third aspect or produced by a method as defined in the fourth aspect;

(S) optionally arranging a second top layer on the core layer from stage (R);

(T) at least partially adhering the first top layer and the optional second top layer to the core layer.

If the core layer of the multi-layer composite comprises only one lightweight building element or consists only of this one lightweight building element, a method can be employed to produce the lightweight composite that provides only for arranging and adhering the one lightweight building element on the first top layer, wherein the second top layer can optionally be adhered to the core layer.

Accordingly, the invention also relates to a multi-layer composite having a top layer and a lightweight building board element according to the invention as a core layer, which is arranged on the top layer, wherein a further top layer is optionally adhered to the core layer. According to the invention, the core layer is surrounded by the top layers in a sandwich-like manner if two top layers are provided.

Preferably, the regions of the elements that are located on the wave peaks (or wave troughs), i.e. the edges, in the multi-layer composite are adhered to the top layer or layers.

According to the invention, multi-layer composites can exhibit comparable or even higher moduli of elasticity while having a significantly lower bulk density than the bulk density of chipboards or OSB boards, for example. This is extraordinarily advantageous for the application. Preferably, multi-layer composites of this type have a bulk density that is only 50% to 80%, preferably 60% to 70% of the bulk density of chipboards or OSB boards.

Seventh Aspect: Deformed Core Layer

In one embodiment, the core layer according to the invention as defined in the third aspect or produced by a method as defined in the fourth aspect can be subjected to a compression deformation step, wherein three-dimensional objects can be produced, i.e. three-dimensionally deformed objects. To this end, the core layer can be deformed in a suitable pressing tool. This deformation can occur during or subsequent to the production of the core layer.

In one embodiment, only the edges of the core layer are deformed, preferably by compression. It is thus possible to seal off the cavities at the edges of the core layer. This compression deformation can be performed during the assembly of the core layer, but also after the assembly of the core layer in a subsequent stage, such as by the thermal softening of the adhesive at the edges. This embodiment offers the advantage that a bar structure can be introduced into the core layer and/or the edges of the core layer.

The possibility arises during compressing of providing the edge portion of the core layer with a crowned profile, i.e. with a rounded profile. This is often desirable in high-quality furniture components, for instance.

In a further embodiment, not only the edge region but also further regions of the core layer can be compression deformed in addition or separately from the edge region.

A method for producing three-dimensional wooden objects by compression deformation is described in DD 271870 and in DE 101 24 912. The process conditions disclosed in these documents can also be applied to the core layer according to the invention.

In a seventh aspect, the invention thus relates to a deformed core layer having lightweight building board elements as defined in the first aspect, or having lightweight building board elements produced by a method as defined in the second aspect, wherein the lightweight building board elements are at least partly deformed and can be produced by a method at least comprising stage (U):

(U) compression-deforming the core layer as defined in the third aspect or the core layer produced by a method as defined in the fourth aspect.

Eighth Aspect: Deformed Multi-Layer Composite

In one embodiment, the multi-layer composite according to the invention as defined in the fifth aspect or produced by a method as defined in the sixth aspect can also be subjected to a compression deformation step, wherein three-dimensional objects can be produced. This compression deformation can be carried out in a manner as defined in the seventh aspect.

Accordingly, in the eighth aspect, the invention relates to a deformed multi-layer composite comprising at least a first top layer or a first and a second top layer, wherein the core layer is a core layer as defined in the third aspect, or is a core layer as produced by a method as defined in fourth aspect, wherein the core layer is adhered to the first top layer or with the first and the second top layer, wherein the core layer is disposed between the first and the second top layers if the multi-layer composite has the second top layer, wherein the core layer and the first top layer or the core layer, the first and the second top layer are at least partly deformed, at least having stage (V):

(V) compression-deforming the multi-layer composite as defined in the fifth aspect or the multi-layer composite produced by a method as defined in the sixth aspect.

Ninth Aspect: Uses

In a ninth aspect, the invention relates to the use of
a lightweight building board element as defined in the first aspect or a lightweight building board produced by a method as defined in the second aspect; or
a core layer as defined in the third aspect or a core layer produced by a method as defined in the fourth aspect;
a multi-layer composite as defined in the fifth aspect or a multi-layer composite produced by a method as defined in the sixth aspect; or
a deformed core layer as defined in the seventh aspect; or
a deformed multi-layer composite as defined in the eighth aspect
in the fields of shell construction, building construction, prefabricated construction, upgrades, interior construction, sound and heat insulation, interior fittings, furniture, doors and door panels, decor and in the construction of automobiles and motor homes, interior finishing of ships and aircraft as well as in packaging technology.

When used in the field of packaging technology, the frequently used corrugated cardboard can also be substituted. This offers the advantage that the relatively large amounts needed for packaging on the basis of corrugated cardboard can be replaced by relatively small amounts of lightweight building board elements, core layers, multi-layer composites, deformed core layers and deformed multi-layer composites according to the invention.

Accordingly, the invention also relates to the use of a lightweight building board element as defined in the first aspect or a lightweight building board produced by a method as defined in the second aspect; or a core layer as defined in the third aspect or a core layer produced by a method as defined in the fourth aspect;

a multi-layer composite as defined in the fifth aspect or a multi-layer composite produced by a method as defined in the sixth aspect; or a deformed core layer as defined in the seventh aspect; or a deformed multi-layer composite as defined in the eighth aspect as a substitute for corrugated cardboard.

EXAMPLES

Exemplary embodiments of the invention are schematically shown in the drawings. They are explained in greater detail with reference to the figures of the drawings.

Figures

FIG. 1 shows a schematic side view of a lightweight building board element having at least one wave, in this case a sinusoidal wave. The wave expands in the x direction in a Cartesian coordinate system, wherein the oscillation plane of the wave lies in or parallel to the x-z plane. The wave can also be described such that platelet-like regions a and b exist, which enclose a common edge c between them. The platelet-like regions are curved, wherein the edge is also a curved surface.

Figure 2:
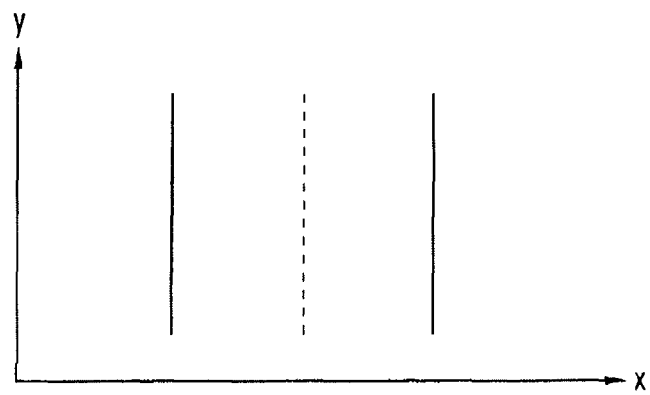
FIG. 2 a top view of the undulated element according to FIG. 1, wherein the solid lines symbolize wave peaks (positive half-wave) and the dashed lines symbolize wave troughs (negative half-waves)
Figure 3:
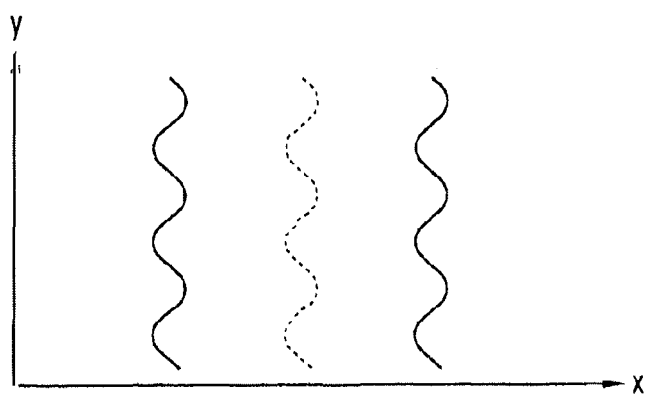
FIG. 3 shows a top view of a lightweight building element according to the invention as seen in FIG. 2 when the wave peaks and wave troughs themselves are deformed to be undulated.
Figure 7:
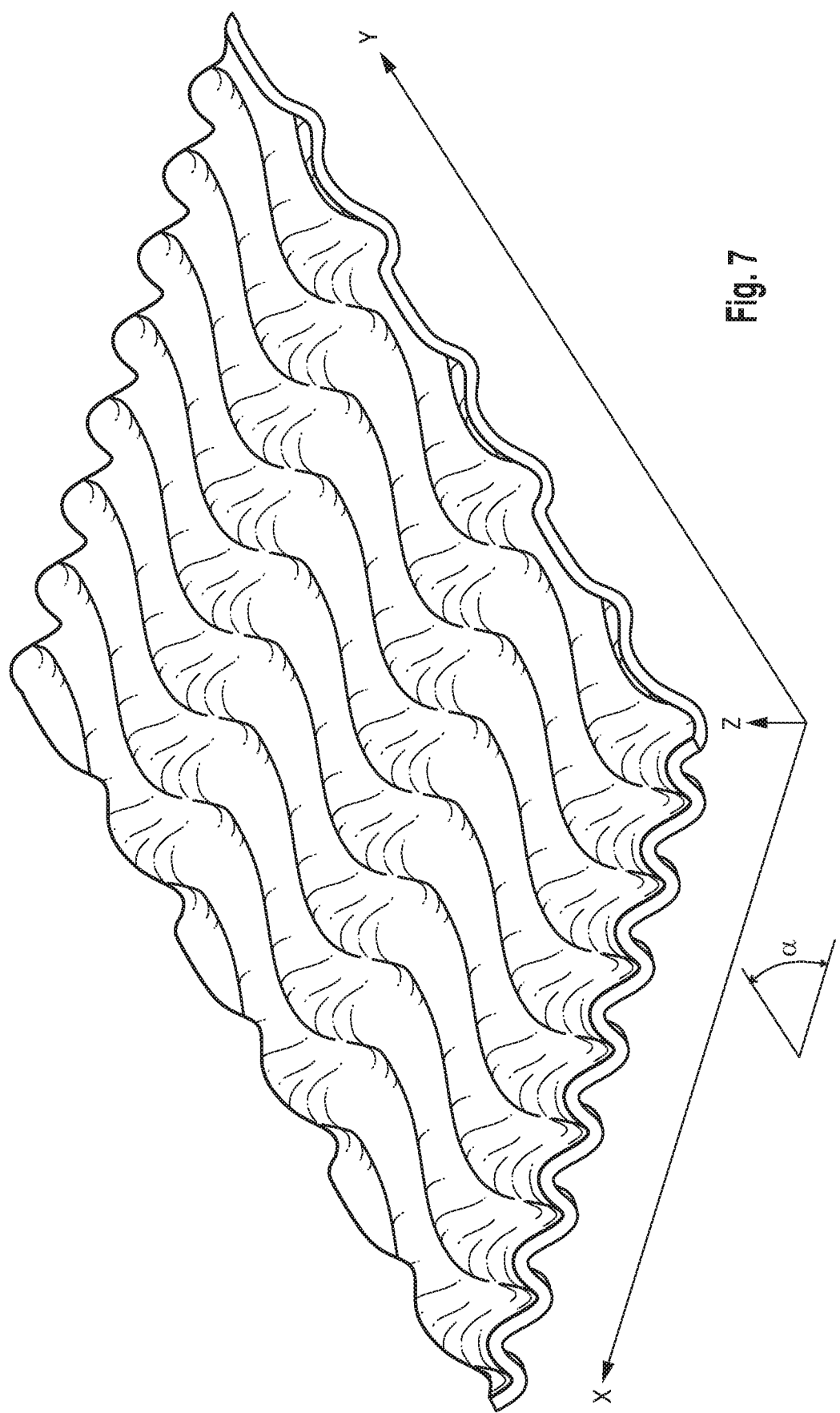
FIG. 7 another perspective representation of the arrangement according to FIG. 3.

FIG. 2 shows a top view of the x-y plane of the lightweight building element according to FIG. 1, wherein the solid lines symbolize wave peaks (positive half-waves) and the dashed lines symbolize wave troughs (negative half-waves);

FIG. 3 shows a top view of the x-y plane of the lightweight building element according to FIG. 2, wherein the wave peaks and wave troughs of the first waves are deformed, i.e. they have a second wave superimposed on them, wherein said second wave is sinusoidal. In this case, when the first wave expands in the x direction in a Cartesian coordinate system with the spatial axes x, y and z and when the oscillation plane of the first wave is parallel to the x-z plane, the oscillation plane of the first wave lies perpendicular to the oscillation plane of the second wave, wherein the second wave expands in the y direction and the oscillation plane lies in or parallel to the x-y plane. FIG. 7 depicts a perspective representation of such a wave configuration.

Figure 4:
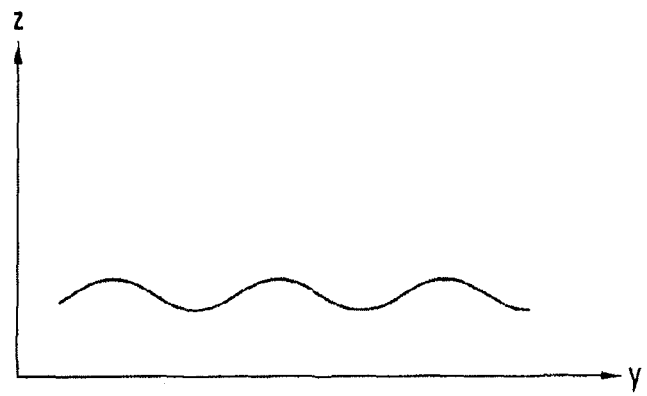
FIG. 4 a side view of the element according to FIG. 3 when a third wave is superimposed onto the second wave, or a side view of the element according to FIG. 2 when a second wave is superimposed onto the first wave.

FIG. 4 shows a side view of a lightweight building board element based on the lightweight building board element according to FIG. 3, wherein the second wave is deformed, i.e. it has a third wave superimposed onto it, wherein said third wave is sinusoidal. In this case, when the first wave expands in the x direction in a Cartesian coordinate system with the spatial axes x, y and z and when the oscillation plane is parallel to the x-z plane, the oscillation plane of the first wave lies perpendicular to the oscillation plane of the second wave, wherein the second wave expands in the y direction and the oscillation plane lies in or parallel to the x-y plane, wherein the oscillation plane of the third wave lies parallel to the y-z plane, wherein the third wave expands in the y direction.

Figure 8:
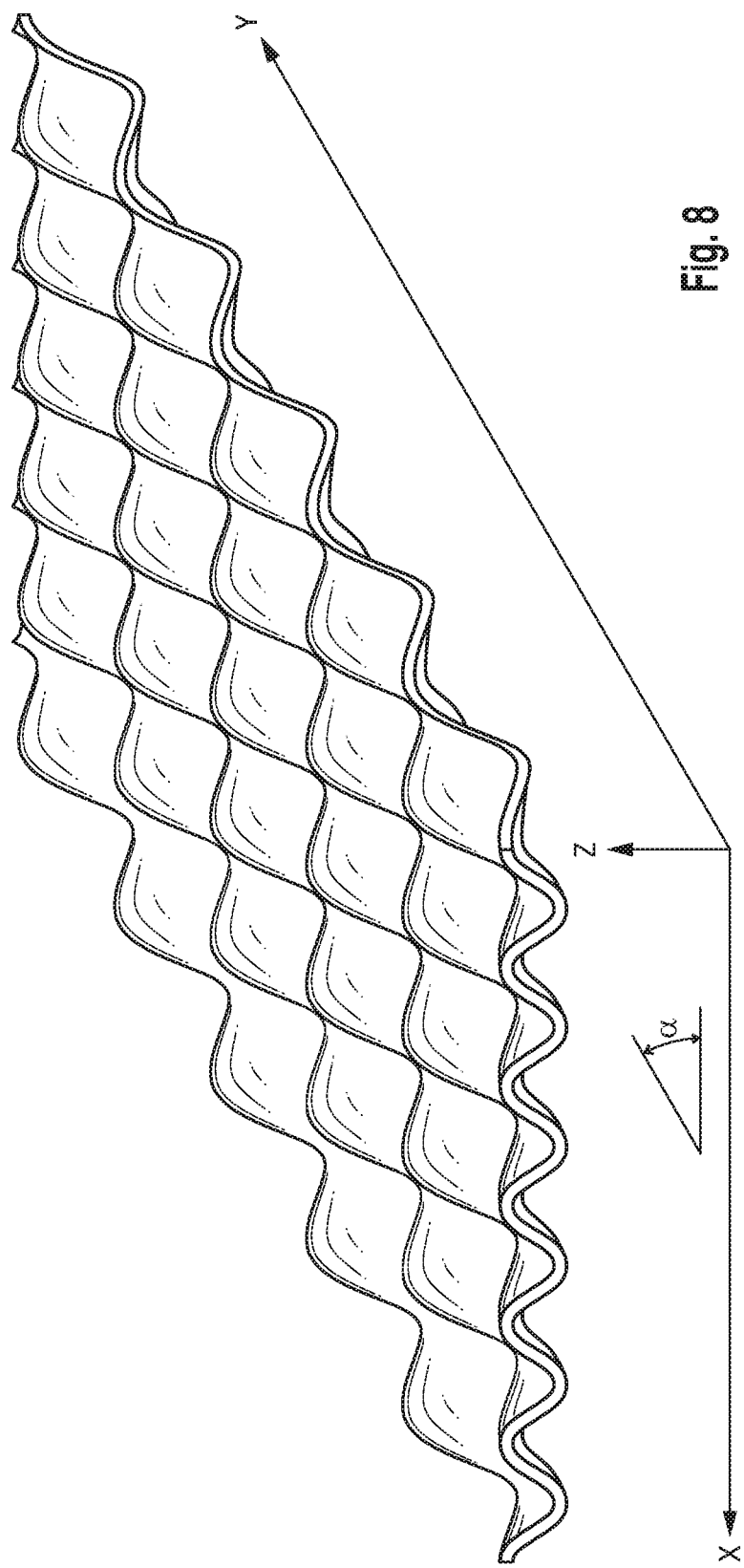
FIG. 8 a perspective representation of the arrangement according to FIG. 2 when a second wave is superimposed onto the first wave.

FIG. 4 also shows a side view of a lightweight building board element based on the lightweight building board element according to FIG. 2, wherein the first wave is deformed, i.e. it has a second wave superimposed onto it. In this case, when the first wave expands in the x direction in a Cartesian coordinate system with spatial axes x, y and z, and the oscillation plane runs in or parallel to the x-z plane, the oscillation plane of the first wave runs perpendicular to the oscillation plane of the second wave, wherein the second wave expands in the y direction and the oscillation plane of the second wave runs in or parallel to the y-z plane. FIG. 8 depicts a perspective representation of such a wave configuration.

Figure 5:
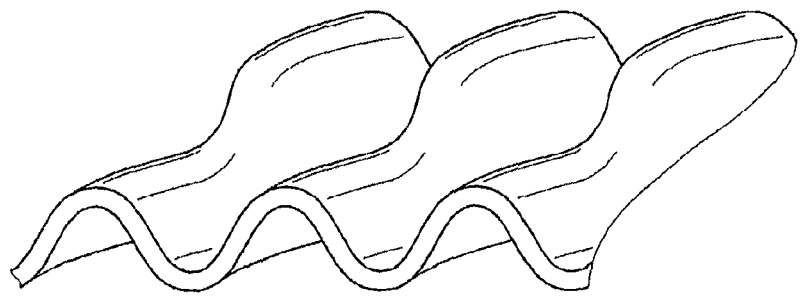
FIG. 5 a schematic perspective representation of the arrangement according to FIG. 3.
Figure 6:
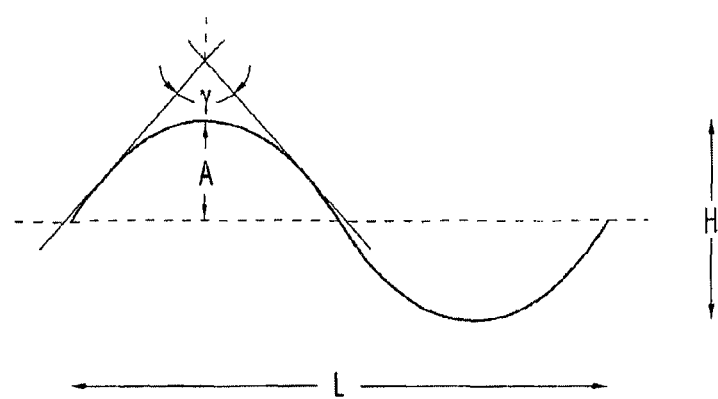
FIG. 6 the opening angle (identified as y) in a sinusoidal wave of an undulated lightweight building board element, which has a wavelength L, a wave height H and an amplitude A.

FIG. 5 shows a schematic perspective representation of the arrangement according to FIG. 3. A sinusoidal second wave is superimposed onto the sinusoidal first wave and/or the wave peaks and wave troughs of the sinusoidal first wave are themselves sinusoidally undulated.

Figure 9:
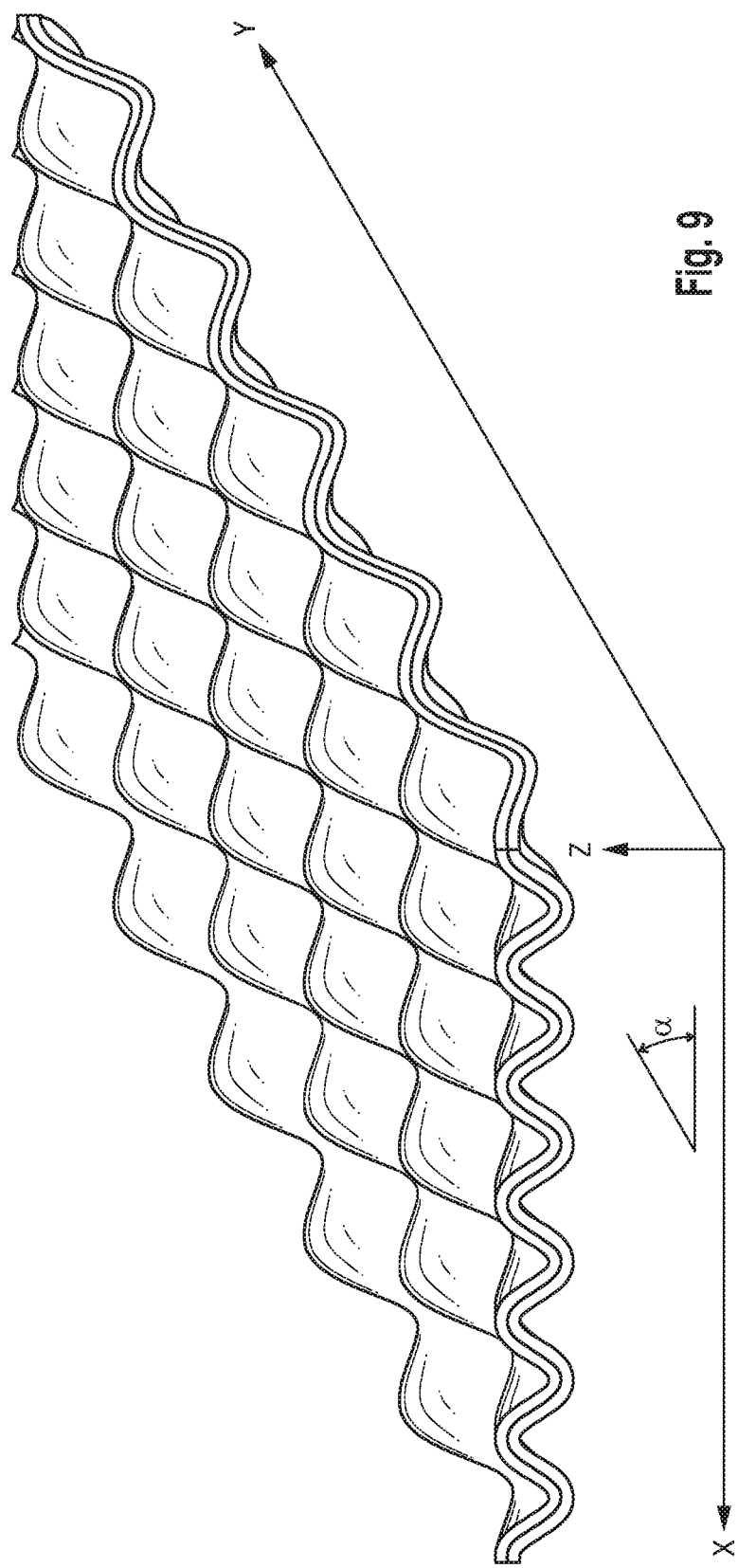
FIG. 9 a core layer having lightweight building board elements arranged in at least a first and a second layer.

FIG. 9 shows a core layer having lightweight building board elements arranged in at least a first and a second layer. The layers can be at least partially adhered to each other.

Application Example

In one application example, planar top layers were pressed on one side and, on the opposite side, 5 mm thick, large-format top layers that were provided with a wavy profile and consisting of a mixture of chipboard top layer chips and chipboard glue were pressed by means of a correspondingly profiled, heated pressing plate at a pressing temperature of 180° C. and for a pressing time of 4 minutes. The wave height measured 3.5 mm with a wavelength of 6 mm.

Parallel to this, large-format wave elements with the same wave measurements and a thickness of 0.6 mm and the same starting material were produced by means of a correspondingly profiled pair of pressing plates. After the pressing, the wave peaks and wave troughs are glued in a roller gluing machine. This is followed by splitting into 40 mm-wide strips by roller cutters and then breaking into 30 to 45 mm-long particles. These particles (lightweight building board elements) were spread by a spreader in layers onto the previously completed top layer, with the wave profile facing upward, up to a height of 28 mm. Finally, the upper top layer was applied, and the pressed packet was pressed at a temperature of 180° C. and to a compression of up to 25 mm.

Obtained was a lightweight building board with a density of 250 kg/m$^3$ and a closed surface that could be sealed with veneer or film.

The invention claimed is:

1. A lightweight building board element that extends along a surface, wherein the light weight building board element has a first undulated profile of a first wave running along the surface with an elongation that changes along a first direction of propagation, in which wave peaks on an upper side and wave troughs on a lower side of the light weight building board element are arranged parallel to each other along a second direction, wherein said second direction lies at an angle a to the first direction and along the surface, where 0°<a<90°, wherein the light weight building board element consists of interconnected wood fibers and an adhesive, wherein the wood fibers are in the form of at least one of individual fibers, fiber bundles, or fiber fragments, and wherein the wood fibers are differently dimensioned.

2. The lightweight building board element according to claim 1, wherein a second undulated profile of a second wave of the lightweight building board element is superimposed onto the first undulated profile so that the wave peaks and wave troughs of the first undulated profile have a further undulation.

3. The lightweight building board element according to claim 1, wherein the lightweight building board element is strip-like.

4. The lightweight building board element according to claim 1, wherein a wave height of the lightweight building board element lies in a range from 1 to 20 mm.

5. The lightweight building board element according to claim 1, wherein a thickness of the lightweight building board element lies in a range from 0.2 to 5 mm and a wave height lies in a range from 2 to 15 mm.

6. The lightweight building board element according to claim 1, wherein the first wave is formed in a shape of a sinus function and/or is sinusoidal.

7. The lightweight building board element according to claim 1, wherein an opening angle of the wave peak or the wave trough lies in a range from 30° to 120°.

8. The lightweight building board element according to claim 1, wherein a wavelength of the first wave lies in a range from 5 to 20 mm.

9. The lightweight building board element according to claim 1, wherein a ratio of length to width of the lightweight building board element falls in a range of from 2:1 to 50:1.

10. The lightweight building board element of claim 1, wherein the lightweight building board element comprises the wood fibers having been arranged such that the wood fibers touch each other, and pressed by a pressing tool to obtain the first undulated profile.

11. A core layer having two or more of the lightweight building board elements as defined in claim 1, wherein the two or more lightweight building board elements in the core layer are arranged in at least one first and one second layer and are at least partly adhered to each other.

12. The core layer according to claim 11, wherein the first and the second layer both contain a multitude of the lightweight building board elements.

13. The core layer according to claim 11, wherein the lightweight building board elements both in the first layer and in the second layer are randomly arranged.

14. The core layer according to claim 11, wherein the first and the second layer both contain only one of the lightweight building board elements.

15. The core layer according to claim 14, wherein an angle between a direction of propagation of the first wave of the lightweight building board element in the first layer and a direction of propagation of the first wave of the lightweight building board element in the second layer is 90°±10°.

16. A multi-layer composite comprising at least a first and a second top layer, the core layer as defined in claim 11, and cavities between the core layer and the first and the second top layers, wherein the core layer is disposed between the first and the second top layers.

17. A lightweight building board element that extends along a surface, wherein the light weight building board element has a first undulated profile of a first wave running along the surface with an elongation that changes along a first direction of propagation, in which wave peaks on an upper side and wave troughs on a lower side of the light weight building board element are arranged parallel to each other along a second direction, wherein said second direction lies at an angle a to the first direction and along the surface, where 0°<a<90°, wherein the light weight building board element consists of interconnected wood fibers and an adhesive, wherein the wood fibers are in the form of at least one of individual fibers, fiber bundles, or fiber fragments, wherein the wood fibers are differently dimensioned and wherein the wood fibers are not glued together.

* * * * *